United States Patent Office 2,789,136
Patented Apr. 16, 1957

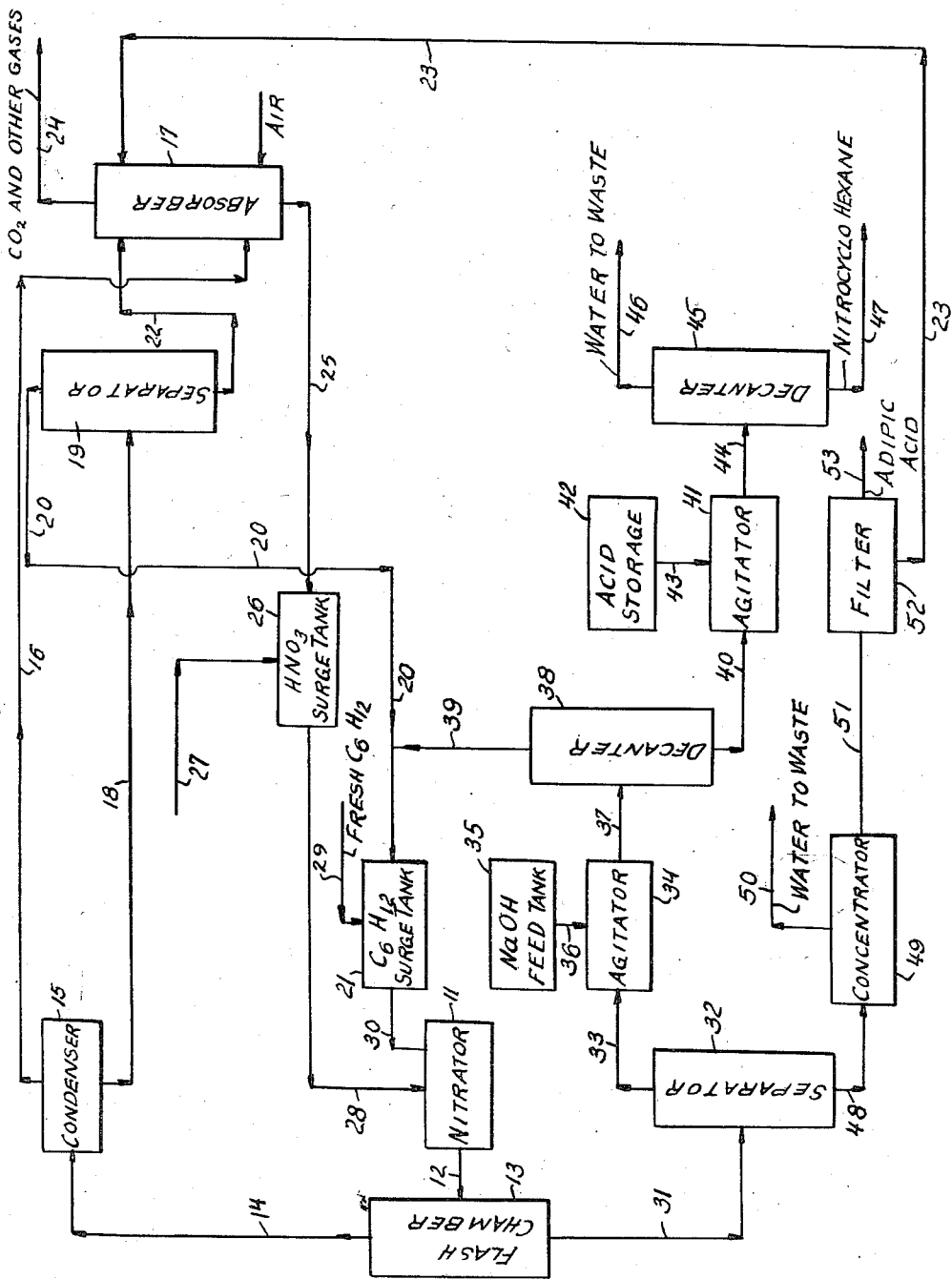

2,789,136

RECOVERY OF NITROCYCLOHEXANE AND ADIPIC ACID

James B. O'Hara, Kenmore, N. Y., assignor to Olin Mathieson Chemical Corporation, a corporation of Virginia Application August 5, 1954, Serial No. 448,089

6 Claims. (Cl. 260—537)

This invention relates to the manufacture of nitrocyclohexane and its sodium salt. My invention is also concerned with a process for manufacturing the sodium salt of nitrocyclohexane and adipic acid through the nitration of cyclohexane. The present invention further relates to a cyclic operation for obtaining as principal products the sodium salt of nitrocyclohexane and adipic acid from cyclohexane in which unreacted cyclohexane and the alkali-insoluble by-products formed are recycled to the principal reaction. Thus the isolation of various by-products is avoided. In this cyclic process it is further advantageous to recover the nitrogen oxide gases as nitric acid which affords as the only ultimate products of the process nitrocyclohexane or its sodium salt, an adipic acid product, nitrogen, nitrous oxide and oxides of carbon. Since nitrocyclohexane, the sodium salt of nitrocyclohexane, and adipic acid are valuable products, it is seen that my cyclic process is particularly economical in that it effects substantially complete conversion of the cyclohexane charge to attractive ultimate products.

The nitration of cyclohexane by means of nitric acid to produce nitrocyclohexane has been previously described. In the prior art, among the products of the reaction noted are nitrocyclohexane and adipic acid, see United States Patent No. 2,343,534. The effluent of the prior art reactions is said to contain appreciable quantities of various by-products including cyclohexanol, cyclohexanone, and cyclohexyl nitrite. Elaborate and expensive means, for example including multiple rectifications, have been proposed for the separation of these principal products and by-products.

In the present invention I have found that the nitrocyclohexane produced in the liquid phase nitration of cyclohexane may be separated as its sodium salt from the other products and the unreacted cyclohexane efficiently and economically by observance of certain process conditions. Also in the present invention I have devised a method in which the reacting mixture from the nitration reaction undergoes an initial treatment in which a major amount of the unreacted cyclohexane is recovered in a single operation. This operation includes flashing the nitration mixture to approximately atmospheric pressure and reduced temperatures from the elevated temperature and superatmospheric pressure in the nitration reactor in order to remove a major portion of the unreacted cyclohexane as overhead from the reaction mixture. Nitrocyclohexane, adipic acid, the various by-products, and minor proportions of unreacted cyclohexane remain in the flash bottoms. Thus nearly all of the unreacted cyclohexane is recovered through effective utilization of the heat contained in the nitration reaction mixture and the recovered cyclohexane is in suitable condition to be directly recycled to the principal reaction upon separation from the other overhead gases. The flashing operation results in a more concentrated solution of nitrocyclohexane and adipic acid in the bottoms through the vaporization of unreacted cyclohexane, water and nitric acid as flash overhead. This facilitates the ultimate recovery of the products and effects process economies, e. g. the size of treating equipment employed in the recoveries may be therefore significantly reduced.

The sodium salt of nitrocyclohexane and adipic acid can be separated from the flash bottoms as ultimate products. Also in my cyclic operation the unreacted cyclohexane and the alkali-insoluble by-products are separated from the flash bottoms and recycled to the nitrating vessel. The gases separated from the flash overhead are treated for the recovery of nitric acid which can be recycled to the principal reactor if desired, while carbon dioxide and other residual gases are discarded. The sodium salt of nitrocyclohexane produced may be used as such, e. g. as the charge stock to a hydrogen sulfide reduction process for producing cyclohexanone oxime, or it may be converted to free nitrocyclohexane by treatment of the salt with a suitable acid.

The present process is particularly applicable to mixtures produced from the nitration of cyclohexane at an elevated temperature and superatmospheric pressure but in general it may be employed in separating nitrocyclohexane, adipic acid, and cyclohexane from any mixture of these materials which is under superatmospheric pressure and at an elevated temperature. Suitable mixtures, say the effluent from the nitration of cyclohexane, usually contain nitrocyclohexane, adipic acid, unreacted cyclohexane, water, nitric acid, gaseous components, and minor amounts of other products.

The mixture of nitrocyclohexane, adipic acid, and cyclohexane to be treated passes to the flashing operation at a temperature of about 150° to 200° C. and at a pressure of about 150 to 500 p. s. i. g. In flashing, the pressure of the mixture is reduced to approximately atmospheric, while the temperature if there were no heat losses would fall to about 65° to 85° C. Usually temperatures of 45 to 75° C. are found, due to heat losses to the atmosphere. Under these conditions the overhead from the flashing vessel will contain a major portion of the unreacted cyclohexane while the bottoms will contain nitrocyclohexane, adipic acid, and the remaining cyclohexane.

For convenience, the remaining descriptions will be directed to the treatment of an effluent from the nitration of cyclohexane to produce nitrocyclohexane and adipic acid which are derived through utilization of about 5 to 40% nitric acid as the nitration agent. When treating such nitration mixtures according to my over-all cyclic operation any alkali insoluble by-products recycled from a prior nitration will be largely converted to either nitrocyclohexane or adipic acid.

The present invention will be described in further detail with reference to the drawing which is a diagrammatic flow sheet of an arrangement of equipment which can be utilized in practicing my overall cyclic process. In situations where it is not desired to operate the over-all process, only that portion of the system necessary to effect the desired result need be employed.

The effluent from nitrator 11 at a temperature of 190° C. and a pressure of 450 p. s. i. g., for example, is discharged by line 12 to flash chamber 13 where it is reduced approximately to atmospheric pressure and about 75° C. The vaporized portion passes from flash chamber 13 by line 14. When it is desired to recover unreacted cyclohexane and nitrogen oxide gases from the chamber effluent, the effluent is passed to partial condenser 15. The uncondensed gases comprising principally nitric oxide, nitrogen peroxide, carbon dioxide and lesser proportions of other gases are charged by line 16 to the base of absorber 17 for the recovery of nitrogen oxides.

The condensate from condenser 15, passed by line 18 to separator 19, comprises a hydrocarbon and an aqueous layer. The upper hydrocarbon layer comprises largely cyclohexane and represents about 60% of the organic portion of the nitrator effluent. It is returned by line 20 to cyclohexane surge tank 21. The aqueous nitric acid condensate in separator 19, representing about 20% of the aqueous effluent from the nitrator, passes by line 22 to the top of absorber 17 for scrubbing the nitric oxide gases. Additional nitric acid from the subsequent described adipic acid recovery is charged by line 23 to absorber 17. The two nitric acid streams are introduced into the absorber at points appropriate to their concentrations. Air for the oxidation of the nitric gases to nitric acid is introduced near the base of the absorber 17. Residual gases containing carbon dioxide are vented through line 24 and recovered nitric acid (about 28%) passes by line 25 to nitric acid surge tank 26. To complete this portion of the cycle, fresh 65% nitric acid is added by line 27 to fortify the nitric acid in surge tank 26 to about 35% which is suitable for charging to nitrator 11 by line 28. Fresh cyclohexane is supplied by line 29, and cyclohexane is charged from surge tank 21 by line 30 to nitrator 11.

The liquid from flash chamber 13 comprises dilute aqueous nitric acid, unnitrated cyclohexane, nitrocyclohexane, adipic acid, and minor proportions of organic by-products of the nitration reaction. The mixture passes from flash chamber 13 by line 31 to separator 32. The supernatant cyclohexane solution of nitrocyclohexane from separator 32 is charged by line 33 to agitator 34. Aqueous caustic (NaOH), preferably dilute, e. g. 15%, is charged from storage 35 by line 36 to agitator 34 to convert the nitrocyclohexane to an aqueous solution of its sodium salt. The resulting mixture passes by line 37 to decanter 38.

The supernatant cyclohexane separated in decanter 38 which contains any alkali-insoluble by-products formed can be isolated or be returned by lines 39 and 29 to the cyclohexane surge tank 21 for recycling. The by-products when recycled are subsequently converted primarily to nitrocyclohexane or adipic acid. The aqueous solution of sodium nitrocyclohexane removed from decanter 38 by line 40 may be utilized as such, for instance as the charge stock for reduction to cyclohexanone oxime. Alternatively, the sodium salt may be separated or isolated from the aqueous solution as by crystallization. When nitrocyclohexane is the desired product, the aqueous solution of sodium nitrocyclohexane is passed by line 40 to agitator 41. An aqueous acid, for example, acetic acid, carbon dioxide, or dilute sulfuric acid from storage 42 is introduced by line 43 to liberate nitrocyclohexane. The acidified mixture passes by line 44 to decanter 45 where the oily product is separated and removed by line 47. It can be dried and distilled. The aqueous layer is removed by line 46. It can be extracted by any suitable solvent if desired and the extracts combined with the separated nitrocyclohexane and distilled. The aqueous portion is preferably discarded.

When adipic acid is desired as a product the aqueous solution containing nitric, adipic and other organic acids is removed from the separator 32 by line 48 to vacuum concentrator 49. Distillate is discarded by line 50 and the residue is concentrated to a slurry of adipic acid crystals. The slurry is moved by line 51 to filter 52. The crystals are washed on the filter, removed by conveyor 53 and dried. The filtrate comprising dissolved organic acids, including adipic, and nitric acid usually having a concentration of about 10 to 20 percent $HNO_3$ is charged by line 23 to nitric gas absorber 17 at a level appropriate to its concentration as part of the scrubbing liquid.

The process of the present invention, being an extraction process, has certain advantages over previously proposed distillation processes for the separation of the nitration product. In the nitration it is frequently advantageous to operate with dilute nitric acid and with low conversions based on cyclohexane. Complete conversion of the nitric acid may thus be obtained, corrosion difficulties are markedly less severe and temperature control of the reaction is easier using a large excess of cyclohexane. The organic product stream is highly diluted, however and the excessive amounts of cyclohexane to be distilled make recovery of the nitrocyclohexane by distillation economically unattractive. With the extraction process of the present invention, large amounts of dilute organic solutions can be extracted at reasonable cost and the advantages of nitration at low conversions of cyclohexane and high conversions of nitric acid in a dilute aqueous system are made economically attractive.

My process may be run continuously, intermittently, or batchwise and is further illustrated by the following specific example which should not be considered limiting:

*Example*

Cyclohexane was nitrated in a continuous nitration unit, introducing an organic and an aqueous feed. The organic feed stream comprised fresh cyclohexane and recycle materials containing minor amounts of nitrocyclohexane, cyclohexyl nitrite and cyclohexanone. The aqueous feed stream comprises fresh 62% nitric acid and recycle materials containing nitric acid, adipic acid and water. The $HNO_3$ content was 33%. The mole ratio of cyclohexane to nitric acid was 3.6:1. Nitration was effected at 170° C. and 350 p. s. i. g. pressure with a retention time of 7.4 minutes.

The effluent from the nitrator passed through a pressure let-down valve into an uninsulated flash chamber in which the pressure was 5 to 10 p. s. i. g. and the temperature was 45° C. In this equipment, appreciable heat losses to the atmosphere occurred.

The vapors passing overhead from the flash chamber were condensed and separated into an aqueous and a non-aqueous phase. The organic phase representing 76.5% by weight of the total organic effluent from the nitrator comprised largely cyclohexane with minor amounts of nitrocyclohexane and cyclohexyl nitrite. It was recycled to the nitrator.

The aqueous portion of the flash overhead representing 19% of the total aqueous effluent from the nitrator contained 8.1% $HNO_3$ and a trace of adipic acid. It was recycled to an acid make-up tank from which the nitrator was charged.

The liquid bottoms from the flash chamber also separated into an aqueous and non-aqueous portion. The non-aqueous layer was fed to an extractor together with sufficient 10% aqueous sodium hydroxide to provide a mole ratio of NaOH to nitrocyclohexane of 1.5:1. After 15 to 20 minutes of violent agitation, the mixture was separated. All of the nitrocyclohexane appeared in the aqueous phase. The organic portion, containing 90% of the cyclohexyl nitrite, was returned to the organic feed make-up tank from which the nitrator was charged.

The aqueous bottoms contained 5.3% $HNO_3$ and 21.7% of organic acids calculated as adipic acid. It was cooled and the adipic acid which crystallized was removed by filtration. The filtrate, containing 17.9% of organic acids calculated as adipic acid, was returned to the acid make-up tank and blended with 62% nitric acid to produce the acid feed to the nitrator.

The off gases amounted to 320 standard cubic feet per pound mole of nitric acid fed to the nitrator and contained 36.7% NO and $NO_2$ making it suitable for charging directly to the nitric acid recovery system.

I claim:

1. A method of recovering the sodium salt of nitrocyclohexane from a mixture of cyclohexane, nitrocyclohexane and adipic acid at a temperature of about 150° to 200° C. and under a pressure of about 150 to 500 p. s. i. g., which comprises flashing the mixture by reduction to about atmospheric pressure while separating vapor overhead and liquid bottoms, separating a non-aqueous phase from the flash bottoms, contacting the said non-aqueous phase with aqueous caustic to form a second non-aqueous phase and an aqueous phase containing the sodium salt of nitrocyclohexane, and separating the resulting aqueous phase from the second non-aqueous phase.

2. A method of recovering nitrocyclohexane from a mixture of cyclohexane, nitrocyclohexane and adipic acid at a temperature of about 150° to 200° C. and under a pressure of 150 to 500 p. s. i. g., which comprises flashing the mixture by reduction to about atmospheric pressure while separating vapor overhead and liquid bottoms, separating a non-aqueous phase from the flash bottoms, contacting the said non-aqueous phase with aqueous caustic to form a second non-aqueous phase and an aqueous phase containing the sodium salt of nitrocyclohexane, separating the resulting aqueous phase from the non-aqueous phase, converting the sodium salt of the aqueous phase to nitrocyclohexane, and recovering the nitrocyclohexane.

3. The method of recovering the sodium salt of nitrocyclohexane and adipic acid from a mixture of cyclohexane, nitrocyclohexane and adipic acid at a temperature of about 150° to 200° C. and under a pressure of about 150 to 500 p. s. i. g., which comprises flashing the mixture by reduction to about atmospheric pressure while separating vapor overhead and liquid bottoms, separating a non-aqueous phase and an aqueous phase from the flash bottoms, recovering adipic acid from the aqueous bottoms phase, contacting the said non-aqueous phase with aqueous caustic to form a second non-aqueous phase and a second aqueous phase containing the sodium salt of the nitrocyclohexane, and separating the resulting second aqueous phase from the second non-aqueous phase.

4. A method of recovering nitrocyclohexane and adipic acid from a mixture of cyclohexane, nitrocyclohexane and adipic acid at a temperature of about 150° to 200° C. and under a pressure of about 150 to 500 p. s. i. g., which comprises flashing the mixture by reduction to about atmospheric pressure while separating vapor overhead and liquid bottoms, separating a non-aqueous phase and an aqueous phase from the flash bottoms, recovering an adipic acid product from the aqueous bottoms phase, contacting the said non-aqueous phase with aqeuous caustic to form a second non-aqueous phase and a second aqueous phase containing the sodium salt of the nitrocyclohexane, separating the resulting second aqueous phase from the non-aqueous phase, converting the sodium salt of the second aqueous phase to nitrocyclohexane, and recovering the nitrocyclohexane.

5. A method of recovering the sodium salt of nitrocyclohexane from the reaction mixture derived from the liquid phase nitration of cyclohexane in an aqueous medium at a temperature of about 150° to 200° C. and a pressure of about 150 to 500 p. s. i. g., which comprises flashing the reaction products by reduction to about atmospheric pressure, while separating vapor overhead and liquid bottoms, recovering cyclohexane from the overhead phase, recycling the recovered cyclohexane to the nitration reaction, separating a non-aqueous phase from the flash bottoms, contacting the said non-aqueous phase with aqueous caustic to form a second non-aqueous phase and a second aqueous phase containing the sodium salt of nitrocyclohexane, separating the resulting second aqueous phase from the second non-aqueous phase, and recycling to the nitration reaction cyclohexane and other alkali-insoluble by-products in the non-aqueous phase.

6. A method of recovering the sodium salt of nitrocyclohexane and adipic acid from the reaction mixture derived from the nitration of cyclohexane in an aqueous medium at a temperature of about 150° to 200° C. and a pressure of about 150 to 500 p. s. i. g., which comprises flashing the reaction products by reduction to about atmospheric pressure while separating vapor overhead and liquid bottoms, recovering cyclohexane from the overhead phase, recycling the recovered cyclohexane to the nitration reaction, separating a non-aqueous phase and an aqueous phase from the flash bottoms, recovering an adipic acid product from the aqueous bottoms phase, contacting the said non-aqueous bottoms phase with aqueous caustic to form a second non-aqueous phase and a second aqueous phase containing the sodium salt of nitrocyclohexane, separating the resulting second aqueous phase from the second non-aqueous phase, and recycling to the nitration reaction cyclohexane and other alkali-insoluble by-products in the second non-aqueous phase.

References Cited in the file of this patent
UNITED STATES PATENTS

| | | |
|---|---|---|
| 2,228,261 | Knowlton | Jan. 14, 1941 |
| 2,343,534 | Cavanaugh et al. | Mar. 7, 1944 |
| 2,459,690 | Doumani et al. | Jan. 18, 1949 |